US012666294B2

(12) United States Patent (10) Patent No.: US 12,666,294 B2
Tian et al. (45) Date of Patent: Jun. 23, 2026

(54) INFORMATION QUANTIZATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Wenqiang Tian, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 406 days.

(21) Appl. No.: 18/349,669

(22) Filed: Jul. 10, 2023

(65) Prior Publication Data

US 2023/0354081 A1 Nov. 2, 2023

Related U.S. Application Data

(63) Continuation of application No. PCT/CN2021/071575, filed on Jan. 13, 2021.

(51) Int. Cl.
H04W 24/10 (2009.01)
H04L 1/00 (2006.01)
(52) U.S. Cl.
CPC ........... H04W 24/10 (2013.01); H04L 1/0026 (2013.01)
(58) Field of Classification Search
CPC ..... H04W 24/10; H04L 1/0026; H04L 1/0029
See application file for complete search history.

(56) References Cited

U.S. PATENT DOCUMENTS

| | | | | |
|---|---|---|---|---|
| 9,961,579 B2* | 5/2018 | Geirhofer | ............ | H04B 7/0645 |
| 2010/0093361 A1 | 4/2010 | Sohn et al. | | |
| 2011/0237282 A1 | 9/2011 | Geirhofer et al. | | |
| 2011/0244847 A1* | 10/2011 | Mallik | ................. | H04B 7/0626 |
| | | | | 455/422.1 |
| 2013/0308713 A1* | 11/2013 | Zhang | ................. | H04B 7/0697 |
| | | | | 375/267 |
| 2015/0222400 A1* | 8/2015 | Xiong | ................... | H04L 1/0077 |
| | | | | 370/329 |

(Continued)

FOREIGN PATENT DOCUMENTS

| | | |
|---|---|---|
| CN | 111435862 A | 7/2020 |
| WO | 2020147741 A1 | 7/2020 |
| WO | 2020151741 A1 | 7/2020 |

OTHER PUBLICATIONS

Huawei, HiSilicon Non-linear Precoding for Downlink Multiuser MIMO 3GPP TSG RAN WG1 Ad-Hoc Meeting NR R1-1700053,Jan. 20, 2017(6 pages).

(Continued)

*Primary Examiner* — Deepa Belur
(74) *Attorney, Agent, or Firm* — Ladas & Parry LLP

(57) ABSTRACT
An information quantization method, a terminal device, and a network device are provided. The information quantization method includes determining a target-grouping quantization scheme. The target-grouping quantization scheme is configured for a terminal device to group a channel state information (CSI) feedback information, and quantize the CSI feedback information in each group according to a corresponding quantization mode of each group. At least two groups are defined to correspond to different quantization modes.

20 Claims, 6 Drawing Sheets

Terminal device

Network device

At operation 610, the terminal device interacts with the network device to determine a target-grouping quantization scheme At operation 620, grouping CSI feedback information based on the target-grouping quantization scheme, and quantizing the CSI feedback information in each group according to a corresponding quantization mode of each group

(56) References Cited

U.S. PATENT DOCUMENTS

| 2022/0060919 A1* | 2/2022 | Li | ......................... | H04B 7/0658 |
| 2022/0077911 A1* | 3/2022 | Sergeev | ............... | H04B 7/0626 |
| 2023/0283342 A1* | 9/2023 | Ahmed Salem | ....... | H04B 7/066 |
| | | | | 370/329 |

OTHER PUBLICATIONS

International Search Report and Written Opinion, International Application No. PCT/CN2021/071575, mailed Oct. 18, 2021 (12 pages).
European Search Report, European Patent Application No. 21918299. 5, mailed Feb. 6, 2024 (8 pages).

* cited by examiner

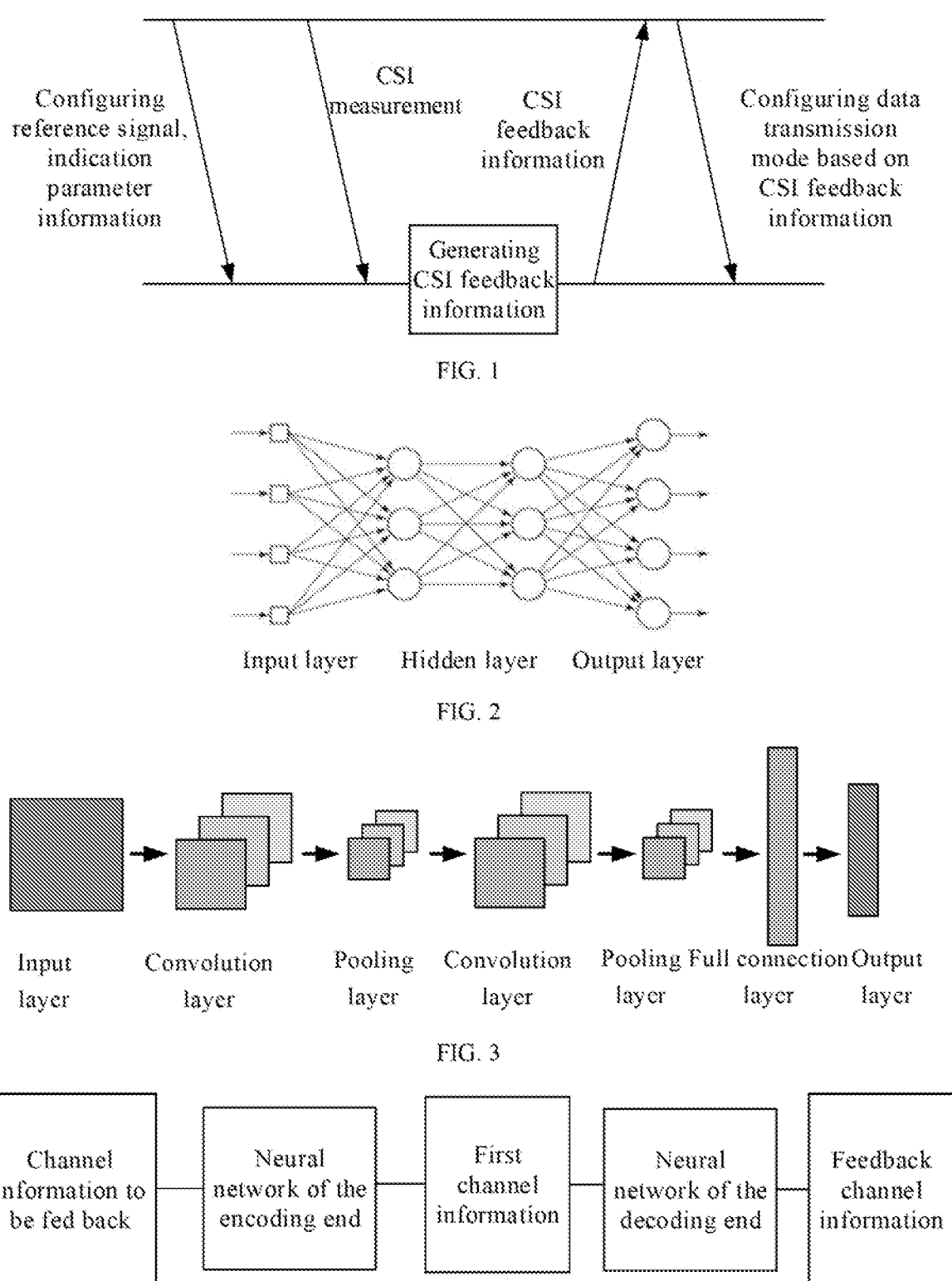

Configuring reference signal, indication parameter information

CSI measurement

CSI feedback information

Configuring data transmission mode based on CSI feedback information

Generating CSI feedback information

FIG. 1

Input layer    Hidden layer    Output layer

FIG. 2

Input layer    Convolution layer    Pooling layer    Convolution layer    Pooling layer    Full connection layer    Output layer

FIG. 3

| Channel information to be fed back | Neural network of the encoding end | First channel information | Neural network of the decoding end | Feedback channel information |

FIG. 4

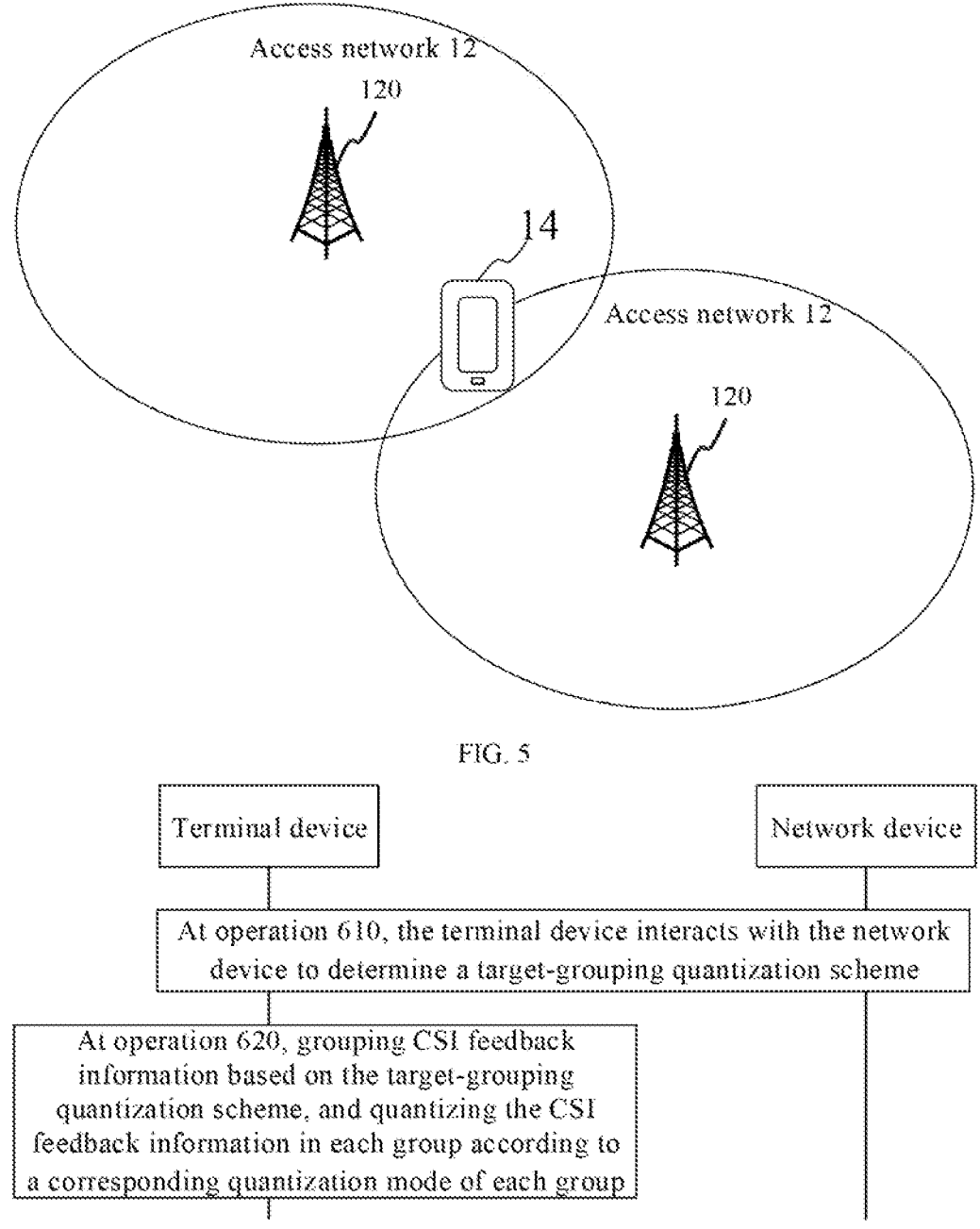

FIG. 5

| Terminal device | Network device |
| --- | --- |

At operation 610, the terminal device interacts with the network device to determine a target-grouping quantization scheme At operation 620, grouping CSI feedback information based on the target-grouping quantization scheme, and quantizing the CSI feedback information in each group according to a corresponding quantization mode of each group

FIG. 6

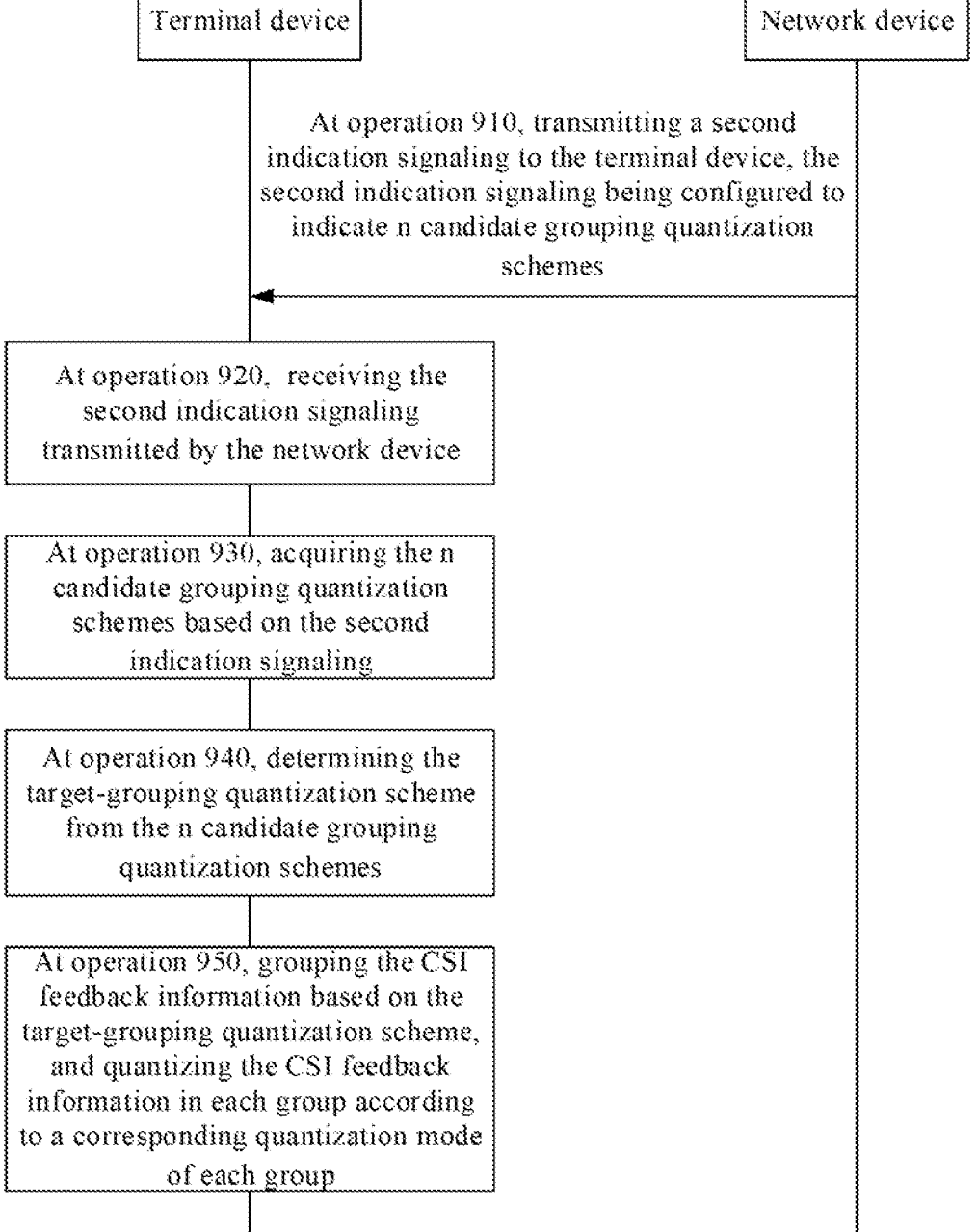

Terminal device

Network device

At operation 910, transmitting a second indication signaling to the terminal device, the second indication signaling being configured to indicate n candidate grouping quantization schemes At operation 920, receiving the second indication signaling transmitted by the network device At operation 930, acquiring the n candidate grouping quantization schemes based on the second indication signaling At operation 940, determining the target-grouping quantization scheme from the n candidate grouping quantization schemes At operation 950, grouping the CSI feedback information based on the target-grouping quantization scheme, and quantizing the CSI feedback information in each group according to a corresponding quantization mode of each group

FIG. 9

Determination module 1301

Processor 101

Transmitter 103

Bus 105

Receiver 102

Memory 104

INFORMATION QUANTIZATION METHOD, TERMINAL DEVICE, AND NETWORK DEVICE

CROSS REFERENCE TO RELATED APPLICATIONS

The present disclosure is a continuation of International (PCT) Patent Application No. PCT/CN2021/071575 filed on Jan. 13, 2021, the contents of which is herein incorporated by reference in its entirety.

TECHNICAL FIELD

The present disclosure relates to the field of communication technology, in particular to an information quantization method, a terminal device, and a network device.

BACKGROUND

Terminal device generally generate CSI feedback information through channel state information (CSI) measurement.

Before reporting the CSI feedback information, the terminal device generally quantizes CSI feedback information. In a related art, a unified quantization strategy is adopted, that is, the terminal device quantizes the CSI feedback information to be fed back in a same quantization way.

SUMMARY

According to an aspect of the present disclosure, an information quantization method performed by a network terminal device is provided and includes: determining a target-grouping quantization scheme. The target-grouping quantization scheme is configured for a terminal device to group a channel state information (CSI) feedback information, and quantize the CSI feedback information in each group according to a corresponding quantization mode of each group. At least two groups are defined to correspond to different quantization modes.

According to an aspect of the present disclosure, a terminal device is provided and includes: a transceiver configured to interact with a network device to determine a target-grouping quantization scheme, a processor connected to the transceiver and configured to group channel state information (CSI) feedback information based on the target-grouping quantization scheme and quantize the CSI feedback information in each group according to a corresponding quantization mode of each group. At least two groups are defined to correspond to different quantization modes.

According to an aspect of the present disclosure, a network device is provided and includes: a processor, and a transceiver configured to interact with a terminal device to determine a target-grouping quantization scheme. The target-grouping quantization scheme is configured for the terminal device to group a channel state information (CSI) feedback information, and quantize the CSI feedback information in each group according to a corresponding quantization mode of each group. At least two groups are defined to correspond to different quantization modes.

BRIEF DESCRIPTION OF THE DRAWINGS

In order to make the technical solution described in embodiments of the present disclosure more clearly, the drawings used for the description of the embodiments or background will be described. Apparently, the drawings in the following description are only some embodiments of the present disclosure. For those skilled in the art, other drawings may be acquired according to the drawings without any creative work.

FIG. 1 is a schematic diagram of generation and indication process of channel state information according to an exemplary embodiment of the present disclosure.

FIG. 2 is a schematic diagram of a neural network according to an exemplary embodiment of the present disclosure.

FIG. 3 is a schematic diagram of the convolutional neural network according to an exemplary embodiment of the present disclosure.

FIG. 4 is a schematic diagram of a schematic diagram of a network architecture using a neural network model for channel state information indication according to an exemplary embodiment of the present disclosure.

FIG. 5 is a block diagram of a communication system according to an exemplary embodiment of the present disclosure.

FIG. 6 is a flowchart of information quantization method according to an exemplary embodiment of the present disclosure.

FIG. 9 is a flowchart of an information quantization method according to an exemplary embodiment of the present disclosure.

DETAILED DESCRIPTION

Figure 7:
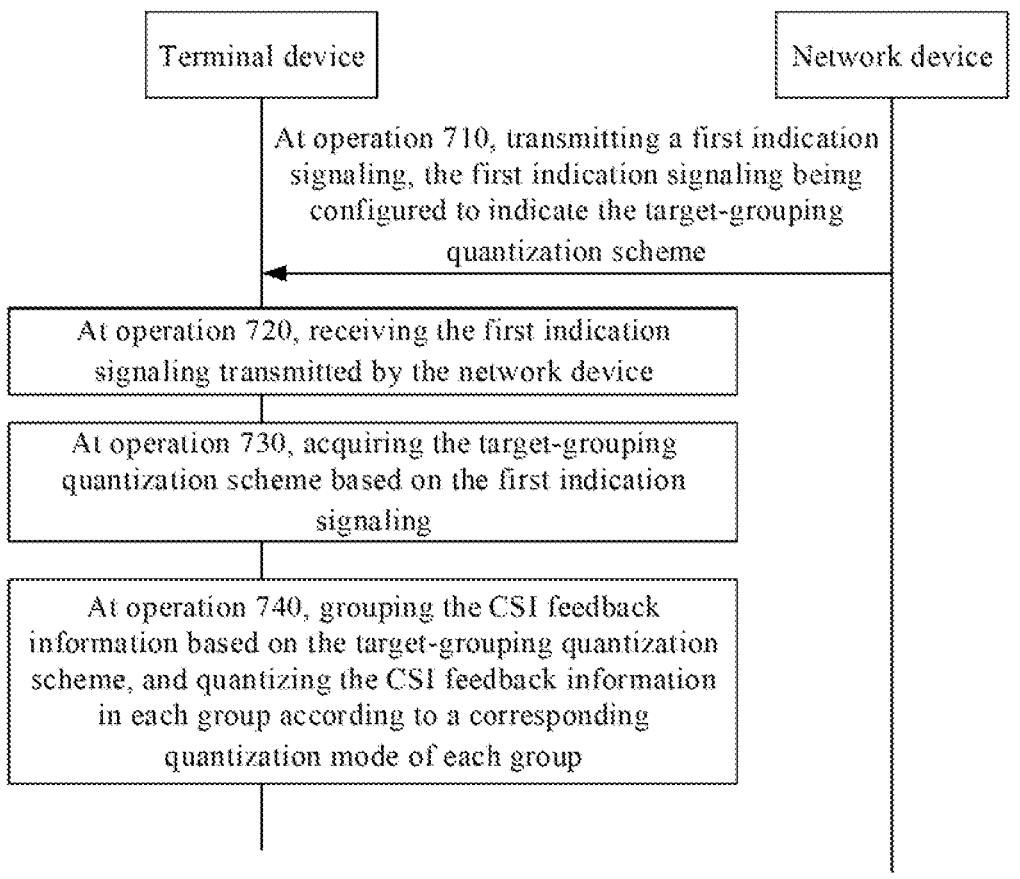
FIG. 7 is a flowchart of an information quantization method according to an exemplary embodiment of the present disclosure.

In order to make purpose, technical solutions and a technical effects of the present disclosure clearer, embodiments of the present disclosure will be further described in detail below in combination with the drawings.

First, terms involved in embodiments of the present disclosure are briefly introduced.

Channel State Information (CSI):

CSI is information configured to describe channel attributes of a communication link.

Indication of the CSI is very important in a communication system, which determines performance of multiple input-multiple-output (MIMO) transmission. In general, CSI indication in the communication system may include indication of channel quality indicator (CQI), precoding matrix indicator (PMI), rank indicator (RI) and the like.

With reference to FIG. 1, an exemplary description of generation and indication mode of the CSI is given. As shown in FIG. 1, a network device may configure the terminal device with indication parameter information for CSI indication. For example, which information in CQI, PMI, RI and other information the terminal device needs to indicate. In addition, the network device may configure some reference signals for CSI measurement for the terminal device, such as a synchronization signal block (SSB) and/or a channel state information-reference signal (CSI-RS). The terminal device determines current channel state information situation by measuring the above reference signals, and indicates current CSI feedback information to the network device according to the indication parameter information configured by the network device, so that the network device may configure a reasonable and efficient data transmission mode based on the current channel situation.

Artificial Intelligence (AI):

In recent years, artificial intelligence research represented by neural networks has made great achievements in many fields, and it will also have an important impact on people's production and life for a long time in the future.

Referring to FIG. 2, FIG. 2 is a schematic diagram of a neural network according to an embodiment of the present disclosure. As shown in FIG. 2, a basic structure of a simple neural network includes: an input layer, a hidden layer and an output layer. The input layer is configured to receive data, the hidden layer is configured to process data, and a final result is generated in the output layer. As shown in FIG. 3, each node represents a processing unit, or is considered as simulating a neuron. Multiple neurons form a layer of neural network, and transmission and processing of multi-layer information form a whole neural network.

With continuous development of neural network research, in recent years, neural network deep learning algorithm has been proposed, and more hidden layers have been introduced. Feature learning through layer by layer training of neural network with multiple hidden layers has greatly improved learning ability and processing ability of neural network, and has been widely used in pattern recognition, signal processing, optimal combination, and anomaly detection, etc.

At the same time, with development of the deep learning, convolutional neural network has also been further studied. Referring to FIG. 3, FIG. 3 is a schematic diagram of the convolutional neural network according to an embodiment of the present disclosure. As shown in FIG. 3, a basic structure of a convolutional neural network includes: an input layer, multiple convolution layers, multiple pooling layers, a full connection layer and an output layer. Introduction of the convolution layer and the pooling layer effectively controls sharp increase of network parameters, limits the number of parameters and exploits characteristics of local structure, thereby improving robustness of algorithm.

Combination of Channel State Information Indication and Artificial Intelligence

In related art, basic principles of wireless communication systems are completed mostly based on theoretical modeling and parameter selection of actual communication environment. With further enhancement of requirements for flexibility, adaptability, speed and capacity of wireless communication systems, gains brought by traditional wireless communication systems based on classical model theory are gradually weakening. At present, some new research has been carried out step by step to solve the above problems. One of them is to use artificial intelligence to realize acquire and indication of the CSI.

Referring to FIG. 4, FIG. 4 is a schematic diagram of a network architecture using a neural network model for channel state information indication according to an exemplary embodiment of the pre sent disclosure. As shown in FIG. 4, an encoding end calls a neural network of the encoding end to encode a channel information to be fed back to generate first channel information, namely CSI feedback information. After receiving the first channel information, a decoding end calls a neural network of the decoding end to decode the first channel information and acquire feedback channel information.

In the above CSI feedback mode based on artificial intelligence, size of the first channel information fed back is directly related to feedback performance. The more information of the first channel information fed back, the higher the degree of the feedback channel information corresponding to the coding end recovering the channel information to be fed back corresponding to the decoding end. In this case, there is a contradiction between feedback overhead of the first channel information and recovery gain of the channel information to be fed back. On the one hand, from an aspect of overhead of communication system, the smaller the feedback overhead required to transmit the first channel information, the better. On the other hand, from an aspect of transmission performance gain of communication system, the higher the recovery degree of the feedback channel information at the decoding end, the better the performance gain of the communication system.

In conclusion, it is necessary to design a quantization scheme of CSI feedback information in a research of CSI feedback based on artificial intelligence, so as to reduce the feedback overhead as far as possible under the condition of ensuring the transmission performance gain.

In related art, a quantization scheme for CSI feedback information is a unified quantization scheme, such as uniform quantization, or μ-law quantization, etc. The above quantization schemes are effective for CSI feedback information without clear rules.

However, through experimental analysis, it may be found that for a specific channel characteristic, some data in CSI feedback information are obviously small, some data are obviously large, and gap is large. In this case, it is defective to configure uniform quantization or other unified quantization as a quantization scheme. For example, when uniform quantization is configured, a large quantization granularity is configured to ensure that large data may be fed back under same number of bits, and the large quantization granularity causes feedback error of smaller data to increase. For example, when a small quantization granularity is configured to ensure feedback accuracy of small data, it causes that a large number of bits is needed when large data is fed back.

To solve the above problems, embodiments of the present disclosure provides an information quantization method, which is mainly configured for the CSI feedback process based on artificial intelligence to minimize feedback overhead in condition of ensuring the quantization accuracy. The solution of the present disclosure is introduced and explained in combination with following examples.

FIG. 5 shows a block diagram of a communication system according to an exemplary embodiment of the present disclosure, the communication system may include an access network 12 and a terminal device 14.

The access network 12 includes several network devices 120. The network device 120 may be a base station, which is an apparatus deployed in the access network to provide wireless communication functions for terminals. The base station may include various forms of a macro base station, a micro base station, a relay station, and an access point, etc. In systems with different wireless access technologies, name of apparatus with functions of a base station may be different, for example, in LTE systems, the apparatus is called eNodeB or eNB. In the 5G NR-U system, the apparatus is called gNodeB or gNB. With the development of communication technology, the description of "base station" may be changed. For the convenience of description, the apparatus providing wireless communication function for the terminal device 14 are collectively referred to as a network device.

The terminal device 14 may include various devices with wireless communication functions, such as a handheld device, an on-board device, a wearable device, a computing device, other processing device connected to wireless modems, various forms of user devices, a mobile station (MS), or a terminal device, etc. For convenience of description, the devices mentioned above are collectively referred to as terminal devices. The network device 120 and the terminal device 14 communicate with each other through some air interface technology, such as an Uu interface.

The technical solution of embodiments of the present disclosure may be performed by various communication systems, such as: a global system of mobile communication (GSM) system, a code division multiple access (CDMA) system, a broadband code division multiple access (WCDMA) system, a general group radio service (GPRS), a long term evolution (LTE) system, a LTE frequency division duplex (FDD) system, a LTE time division duplex (TDD) system, an advanced long term evolution (LTE-A) system, a new radio (NR) system, a evolution system on NR system, a LTE based access to unlicensed spectrum (LTE-U) system, a NR-U system, an universal mobile communication system (UMTS), a worldwide interoperability for microwave access (WiMAX) communication system, a wireless local area networks (WLAN), a wireless fidelity (WiFi), a 6th generation mobile communication technology (6G) system, a next generation communication system, and other communication systems, etc.

Generally speaking, traditional communication systems support a limited number of connections and are easy to be implemented. However, with the development of communication technology, mobile communication systems will not only support traditional communication, but also support, for example, device to device (D2D) communication, machine to machine (M2M) communication, machine type communication (MTC), vehicle to vehicle (V2V) communication, and vehicle to everything (V2X) communication, etc., embodiments of the present disclosure may also be performed by these communication systems.

FIG. 6 a flowchart of information quantization method according to an exemplary embodiment of the present disclosure. The method may be performed by the communication system shown in FIG. 5, and the method includes following.

At operation 610, the terminal device interacts with the network device to determine a target-grouping quantization scheme.

The terminal device interacts with the network device so that the terminal device and the network device determine the target-grouping quantization scheme.

Since both sides of the terminal device and the network device need a unified quantization scheme, the network device may acquire correct CSI feedback information based on the same quantization scheme after the terminal device quantizes the CSI feedback information using a quantization scheme. Therefore, at operation 610, both sides of the terminal device and the network device determine the same target-grouping quantization scheme. In some embodiments, by performing at least one interaction between the terminal device and the network device, the terminal device and the network device may determine the target-grouping quantization scheme.

At operation 620, the terminal device groups CSI feedback information based on the target-grouping quantization scheme, and quantizes the CSI feedback information in each group according to a corresponding quantization mode of each group.

In embodiments of the present disclosure, the target-grouping quantization scheme is a quantization scheme that quantizes the CSI feedback information in a form of grouping. At least two groups are defined to correspond to different quantization modes.

That is, in the target-grouping quantization scheme, the CSI feedback information is supported to be divided into n groups for feedback, the n is a positive integer not less than 2, and the n groups correspond to n quantization modes one by one. In some embodiments, n quantization modes are different from each other. In some embodiments, at least two of the n quantization modes are different.

For example, the target-grouping quantization scheme includes three groups: a first group, a second group, and a third group. The first group corresponds to a first quantization mode, the second group corresponds to a second quantization mode, and the third group corresponds to a third quantization mode. The first quantization mode to the third quantization mode are different from each other.

After determining the target-grouping quantization scheme, the terminal device groups the CSI feedback information according to indication of the target-grouping quantization scheme, and then quantizes the CSI feedback information in each group according to the quantization mode corresponding to each group. The above grouping quantization may also be understood as a kind of classification quantization. By classifying CSI feedback information with different distribution characteristics, the CSI feedback information enter different groups, and then quantization is carried out in different quantization modes according to the target-grouping quantization scheme.

For example, the target-grouping quantization scheme includes three groups: the first group, the second group, and the third group. The first group corresponds to a first quantization mode, the second group corresponds to a second quantization mode, and the third group corresponds to a third quantization mode. The terminal device classifies first part of CSI feedback information into the first group, quantizes the first part with the first quantization mode, classifies second part of CSI feedback information into the second group, quantizes the second part with the second quantization mode, and classifies third part of CSI feedback information into the third group, quantizes the third part with the third quantization mode.

It may be understood that the CSI feedback information corresponding to different groups has their own distribution characteristics. For example, the CSI feedback information is in different size ranges or in different amplitude ranges. In this case, different quantization modes of different groups may be configured to avoid unified quantization between CSI feedback information with different distribution characteristics.

In some embodiments, the CSI feedback information is generated based on a neural network model. For example, with reference to FIG. 4, there is a coding end neural network on a terminal device side. The terminal device generates through CSI measurement, and transforms the channel information to be fed back into first channel information (CSI feedback information) through a coding end neural network.

In some embodiments, after the terminal device groups and quantizes the CSI feedback information, it acquires quantized CSI feedback information, transmits the quantized CSI feedback information to the network device. The network device receives the quantized CSI feedback information, and de-quantizes according to the target-grouping quantization scheme to acquire the CSI feedback information.

In conclusion, in the method provided in embodiments of the present disclosure, the terminal device and the network device interact the target-grouping quantization scheme, so that the terminal device group the CSI feedback information based on the target-grouping quantization scheme, and quantize the CSI feedback information in each group according to a quantization method corresponding to the group. Since at least two groups are defined to correspond to different quantization methods, compared with the unified quantization scheme configured for the related art, this grouping quantization method makes full use of distribution characteristics of the CSI feedback information, quantizes the CSI feedback information with different distribution characteristics through different groups, so as to reduce the number of bits needed for quantization as far as possible under a condition of ensuring quantization accuracy, thereby reducing feedback overhead of the CSI feedback information.

In some embodiments based on FIG. 6, the target-grouping quantization scheme is determined by interaction between the terminal device and the network device, and there are two different schemes as follows.

At a first scheme, the network device indicates the target-grouping quantization scheme to the terminal device.

At a second scheme, the network device indicates a plurality of candidate target-grouping quantization schemes to the terminal device, and the target-grouping quantization scheme is one of the plurality of candidate target-grouping quantization schemes.

1) The network device indicates the target-grouping quantization scheme in the plurality of candidate target-grouping quantization schemes.

2) The terminal device indicates the target-grouping quantization scheme in the plurality of candidate target-grouping quantization schemes.

In the following, the above schemes are illustrated by examples.

At a first scheme, the network device indicates the target-grouping quantization scheme to the terminal device.

FIG. 7 is a flowchart of an information quantization method according to an exemplary embodiment of the present disclosure. The method may be performed by the communication system shown in FIG. 5, and the method includes following.

At operation 710, the network device transmits a first indication signaling. The first indication signaling is configured to indicate the target-grouping quantization scheme.

After determining the target-grouping quantization scheme, the network device configures the target-grouping quantization scheme to the terminal device through the first indication signaling. In some embodiments, the network device determines the target-grouping quantization scheme based on a current channel characteristic.

In some embodiments, the first indication signaling includes at least one of the following: a broadcast message, a system information block (SIB), a radio resource control (RRC) message, a RRC reconfiguration signaling, downlink control information (DCI), a medium access control (MAC)-a control element (CE), a physical downlink control channel (PDCCH) order, and data information. Embodiments of the present disclosure does not define a specific type of the first indication signaling.

It may be understood that the SIB is a possible implementation form of the broadcast message, and the RRC reconfiguration signaling is a possible implementation form of the RRC message. That is, the first indication signaling includes at least one of the following: a broadcast message, a RRC message, DCI, a MAC-CE, a PDCCH order, and data information. The broadcast message includes the SIB, and the RRC message includes the RRC reconfiguration signaling.

At operation 720, the terminal device receives the first indication signaling transmitted by the network device.

At operation 730, the terminal device acquires the target-grouping quantization scheme based on the first indication signaling.

After receiving the first indication signaling, the terminal device acquires the target-grouping quantization scheme configured by the network device through the first indication signaling.

At operation 740, the terminal device groups the CSI feedback information based on the target-grouping quantization scheme, and quantizes the CSI feedback information in each group according to a corresponding quantization mode of each group.

In some embodiments, the target-grouping quantization scheme includes at least one of the following information: feedback mode information for each group and feedback parameter information for each group. The feedback mode information is configured to describe the quantization mode corresponding to the group, and the feedback parameter information is configured to describe the parameters corresponding to the quantization mode. The feedback mode information and feedback parameter information jointly indicate the quantization mode corresponding to the group.

In some embodiments, the feedback mode information includes at least one of the following information: uniform quantization and non-uniform quantization. The uniform quantization is a quantization method that quantizes the CSI feedback information with one quantization granularity. The non-uniform quantization is a quantization method that quantizes the CSI feedback information with different quantization granularity in different intervals.

In some embodiments, the feedback parameter information includes at least one of the following information: quantization bit, quantization granularity, and quantization range. Embodiments of the present disclosure does not limit specific feedback mode information and feedback parameter information. The quantization bit is the number of bits configured to quantize data in CSI feedback information. The quantization granularity is interval between adjacent quantization values. The quantization range is range of data that supports quantization.

For example, the feedback mode information is uniform quantization. Corresponding feedback parameter information includes: quantization bit being 2 bits, quantization granularity being 1, and quantization range being 0-3. For data 0, quantized data is 00. For data 1, quantized data is 01. For data 2, quantized data is 10. For data 3, quantized data is 11.

For example, the feedback mode information is non-uniform quantization. Corresponding feedback parameter information includes: quantization bit being 2 bits, quantization granularity corresponding to quantization range 0-1 being 0.5, and quantization granularity corresponding to quantization range 1-2 being 1. For data 0, quantized data is 00. For data 0.5, quantized data is 01. For data 1, quantized data is 10. For data 2, quantized data is 11.

For example, the network device configures that the terminal device adopts feedback mode 1 as the target-grouping quantization scheme in the first indication signaling. The feedback mode 1 includes: the number of feedback bits being 256 bits. The 256 bits are divided into four groups, 64 bits in a first group are acquired by a first quantization mode, 64 bits in a second group are acquired by a second quantization mode, 64 bits in a third group are acquired by a third quantization mode, 64 bits in a fourth group are acquired by a fourth quantization mode.

In the first quantization mode corresponding to the first group, uniform quantization is adopted. The quantization granularity is a first quantization granularity, the quantization bit is a first quantization bit, and the quantization range is a first quantization range. For example, when the first quantization granularity is $1/(2^4)$, the first quantization bit is 4, and the first quantization range is 0 to 1, then the first quantization mode quantizes the number between 0 and 1 through 4 bits, and the quantization granularity is kept at $1/(2^4)$. 16 real numbers may be fed back in the above way.

In the second quantization mode corresponding to the second group, uniform quantization is adopted. The quantization granularity is a second quantization granularity, the quantization bit is a second quantization bit, and the quantization range is a second quantization range. For example, when the second quantization granularity is $1/(2^4)$, the second quantization bit is 2, and the second quantization range is 0 to 0.25, then the second quantization mode quantizes the number between 0 and 0.25 through 2 bits, and the quantization granularity is kept at $1/(2^4)$. 32 real numbers may be fed back in the above way.

In the third quantization mode corresponding to the third group, uniform quantization is adopted. The quantization granularity is a third quantization granularity, the quantization bit is a third quantization bit, and the quantization range is a third quantization range. For example, when the third quantization granularity is $1/(2^3)$, the third quantization bit is 4, and the third quantization range is 0 to 2, then the third quantization mode quantizes the number between 0 and 2 through 4 bits, and the quantization granularity is kept at $1/(2^3)$. 16 real numbers may be fed back in the above way.

In the fourth quantization mode corresponding to the fourth group, uniform quantization is adopted. The quantization granularity is a fourth quantization granularity, the quantization bit is a fourth quantization bit, and the quantization range is a fourth quantization range. For example, when the fourth quantization granularity is $1/(2^2)$, the fourth quantization bit is 4, and the fourth quantization range is 0 to 4, then the fourth quantization mode quantizes the number between 0 and 4 through 4 bits, and the quantization granularity is kept at $1/(2^2)$. 16 real numbers may be fed back in the above way.

In conclusion, in the method according to embodiments of the present disclosure, the network device indicates the target-grouping quantization scheme to the terminal device by transmitting the first indication signaling, which realizes the unified quantization scheme between the network device and the terminal device with a simple interaction process, and avoids errors in the quantization and de-quantization process on both sides.

Figure 8:
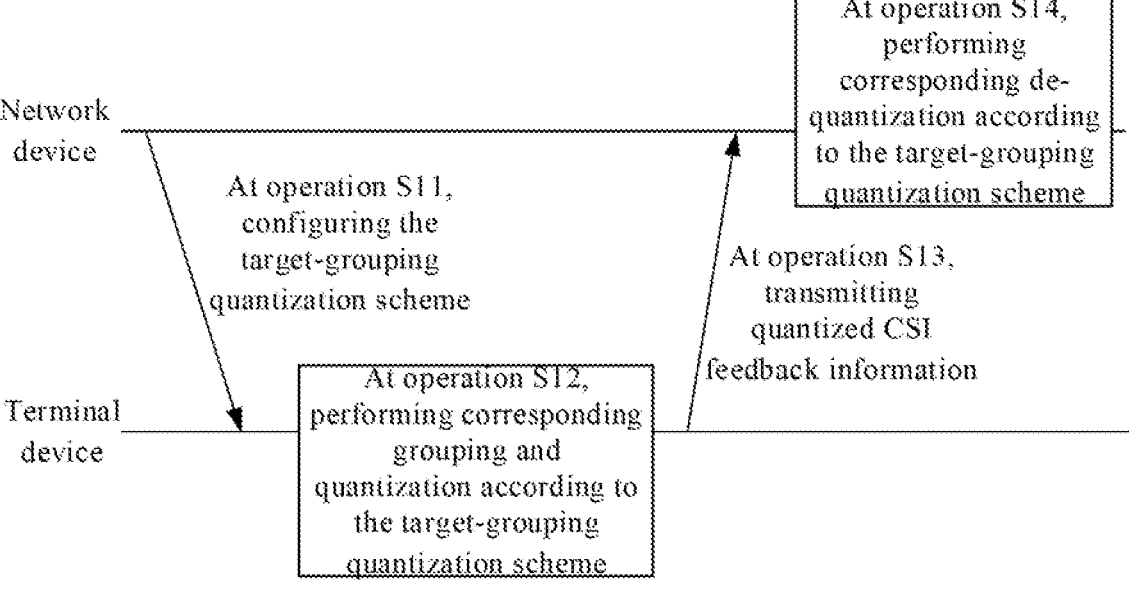
FIG. 8 is a schematic diagram of an information quantization process according to an exemplary embodiment of the present disclosure.

For example, with reference to FIG. 8, the above embodiments are described in an exemplary manner. The method includes the following operations.

At operation S11, the network device configures the target-grouping quantization scheme for the terminal device.

In some embodiments, the network device configures the terminal device through at least one of a broadcast message, a SIB, a RRC message, a RRC reconfiguration signaling, DCI, a MAC-CE, a PDCCH order, and data information.

At operation S12, the terminal device performs corresponding grouping and quantization according to the target-grouping quantization scheme.

The terminal device receives the target-grouping quantization scheme configured by the network device, and groups and quantizes the CSI feedback information according to the target-grouping quantization scheme.

At operation S13, the terminal device transmits quantized CSI feedback information to the network device.

At operation S14, the network device performs corresponding de-quantization according to the target-grouping quantization scheme.

After receiving the quantized CSI feedback information, the network device de-quantizes the quantized CSI feedback information according to the target-grouping quantization scheme.

At the second scheme, the network device indicates the plurality of candidate target-grouping quantization schemes to the terminal device, and the target-grouping quantization scheme is one of the plurality of candidate target-grouping quantization schemes.

FIG. 9 is a flowchart of an information quantization method according to an exemplary embodiment of the present disclosure. The method may be performed by the communication system shown in FIG. 5, and includes following.

At operation 910, the network device transmits a second indication signaling to the terminal device. The second indication signaling is configured to indicate n candidate grouping quantization schemes.

The n is a positive integer greater than 1. That is, there are a plurality of candidate grouping quantization schemes.

The network device determines n candidate grouping quantization schemes, and configures the n candidate grouping quantization schemes to the terminal device through the second indication signaling. In some embodiments, the n candidate grouping quantization schemes are different from each other. In some embodiments, the n candidate grouping quantization schemes include at least two different candidate grouping quantization schemes.

In some embodiments, the second indication signaling includes at least one of the following: a broadcast message, a SIB, a RRC message, a RRC reconfiguration signaling, DCI, a MAC-CE, a PDCCH order, and data information. Embodiments of the present disclosure does not define specific type of the second indication signaling.

It may be understood that the SIB is a possible implementation form of the broadcast message, and the RRC reconfiguration signaling is a possible implementation form of the RRC message. That is, the second indication signaling includes at least one of the following: a broadcast message, a RRC message, DCI, a MAC-CE, a PDCCH order, and data information. The broadcast message includes the SIB, and the RRC message includes the RRC reconfiguration signaling.

At operation 920, the terminal device receives the second indication signaling transmitted by the network device.

At operation 930, the terminal device acquires the n candidate grouping quantization schemes based on the second indication signaling.

For example, the network device configures feedback mode 1 to feedback mode 3 in the second indication signaling for the terminal device as candidate grouping quantization schemes. That is, n is 3.

The feedback mode 1 includes: the number of feedback bits being 256 bits divided into four groups, 64 bits of the first group being acquired by a first quantization mode, 64 bits of the second group being acquired by a second quantization mode, 64 bits of the third group being acquired by a third quantization mode, and 64 bits of the fourth group being acquired by a fourth quantization mode.

The feedback mode 2 includes: the number of feedback bits being 128 bits divided into two groups, 64 bits of the first group being acquired by a fifth quantization mode, and 64 bits of the second group being acquired by a sixth quantization mode.

The feedback mode 3 includes: the number of feedback bits being 128 bits divided into one group, and 128 bits of this group being acquired by a seventh quantization mode.

It may be understood that, as shown in the feedback mode 3, in case where the network device configures a plurality of candidate grouping quantization schemes, there may be a candidate grouping quantization scheme that only includes one group.

At operation 940, the terminal device determines the target-grouping quantization scheme from the n candidate grouping quantization schemes.

In some embodiments, the network device indicates the target-grouping quantization scheme in a plurality of candidate target-grouping quantization schemes.

That is, operation 940 is alternatively implemented as: the network device transmits a third indication signaling configured to indicate the target-grouping quantization scheme in the n candidate grouping quantization schemes. The terminal device receives the third indication signaling transmitted by the network device. The terminal device determines the target-grouping quantization scheme from the n candidate grouping quantization schemes based on the third indication signaling.

In some embodiments, the third indication signaling includes at least one of the following: a broadcast message, a SIB, a RRC message, a RRC reconfiguration signaling, DCI, a MAC-CE, a PDCCH order, and data information. Embodiments of the present disclosure does not define specific type of the third indication signaling.

It may be understood that the SIB is a possible implementation form of the broadcast message, and the RRC reconfiguration signaling is a possible implementation form of the RRC message. That is, the third indication signaling includes at least one of the following: a broadcast message, a RRC message, DCI, a MAC-CE, a PDCCH order, and data information. The broadcast message includes the SIB, and the RRC message includes the RRC reconfiguration signaling.

For example, the network device indicates, through DCI, that currently adopted target-grouping quantization scheme is xth candidate grouping quantization scheme in n preconfigured candidate grouping quantization schemes, and the x is a positive integer not greater than n.

In some embodiments, the network device determines the target-grouping quantization scheme based on current channel characteristics.

In some embodiments, the terminal device indicates the target-grouping quantization scheme in a plurality of candidate target-grouping quantization schemes.

That is, after operation 940, the terminal device transmits a fourth indication signaling to the network device. The fourth indication signaling is configured to indicate the target-grouping quantization scheme in n candidate grouping quantization schemes. The network device receives the fourth indication signaling transmitted by the terminal device. The network device determines the target-grouping quantization scheme from the n candidate grouping quantization schemes based on the fourth indication signaling.

In some embodiments, the fourth indication signaling includes at least one of the following: uplink control information (UCI), a physical uplink control channel (PUCCH), a RRC message, and data information. It may be understood that the RRC message here is a message transmitted by the terminal device to the network device. The RRC message may be supported in subsequent evolution of mobile communication systems.

For example, the terminal device indicates, through UCI, that currently adopted target-grouping quantization scheme is xth candidate grouping quantization scheme in n preconfigured candidate grouping quantization schemes, and x is a positive integer not greater than n.

In some embodiments, the terminal device determines the target-grouping quantization scheme based on current channel characteristics.

At operation 950, the terminal device groups the CSI feedback information based on the target-grouping quantization scheme, and quantizes the CSI feedback information in each group according to a corresponding quantization mode of each group.

In some embodiments, the target-grouping quantization scheme includes at least one of the following information: feedback mode information for each group and feedback parameter information for each group. The feedback mode information is configured to describe the quantization mode corresponding to the group, and the feedback parameter information is configured to describe the parameters corresponding to the quantization mode. The feedback mode information and feedback parameter information jointly indicate the quantization mode corresponding to the group.

In some embodiments, the feedback mode information includes at least one of the following information: uniform quantization and non-uniform quantization. The uniform quantization is a quantization method that quantizes the CSI feedback information with one quantization granularity. The non-uniform quantization is a quantization method that quantizes the CSI feedback information with different quantization granularity in different intervals.

In some embodiments, the feedback parameter information includes at least one of the following information: quantization bit, quantization granularity, and quantization range. The quantization bit is the number of bits configured to quantize data in CSI feedback information. The quantization granularity is interval between adjacent quantization values. The quantization range is range of data that supports quantization.

In conclusion, in the method provided in embodiments of the present disclosure, in case where the network device configures a plurality of candidate grouping quantization schemes for the terminal device in advance, the target-grouping quantization scheme is selected from the plurality of candidate target-grouping quantization schemes according to the indication of the network device or the terminal device. Since the indication does not need to carry specific information of the target-grouping quantization scheme, the quantization scheme between the network device and the terminal device is unified with less overhead to avoid errors in quantization and de-quantization on both sides.

Figures 10, 11, 12:
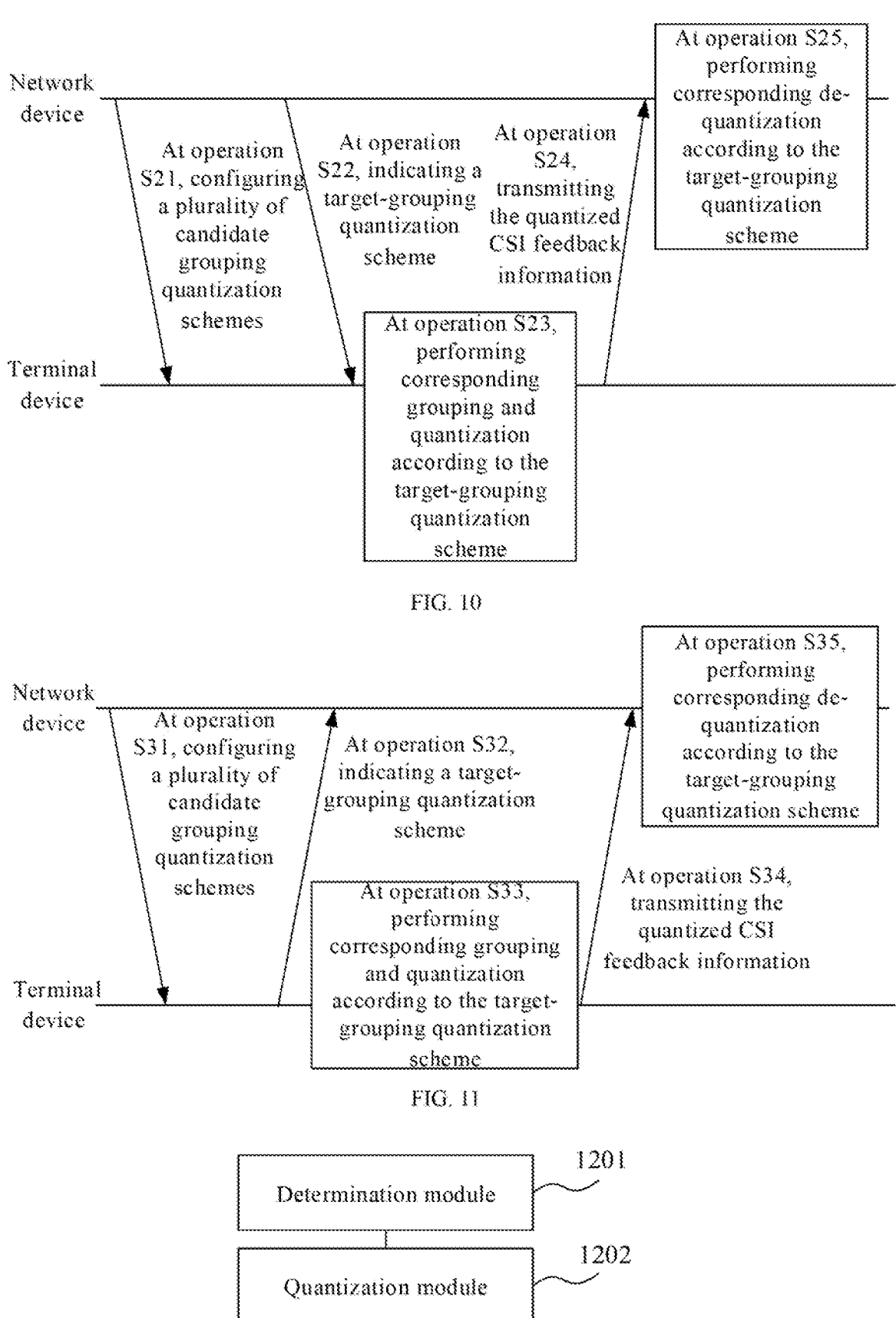
FIG. 10 is a schematic diagram of an information quantization process according to an exemplary embodiment of the present disclosure.
FIG. 11 is a schematic diagram of an information quantization process according to an exemplary embodiment of the present disclosure.
FIG. 12 is a structural block diagram of an information quantization apparatus according to an exemplary embodiment of the present disclosure.

For example, with reference to FIG. 10, the above embodiments are described in an exemplary manner. The method includes following operations.

At operation S21, the network device configures a plurality of candidate grouping quantization schemes for the terminal device.

In some embodiments, the network device may pre-configure the terminal device through at least one of a broadcast message, a SIB, a RRC message, a RRC reconfiguration signaling, DCI, a MAC-CE, a PDCCH order, and data information.

In some embodiments, for any candidate grouping quantization scheme, the candidate grouping quantization scheme includes at least one of the following information: feedback mode information for each group and feedback parameter information for each group. In some embodiments, the feedback mode information includes at least one of the following information: uniform quantization and non-uniform quantization. In some embodiments, the feedback parameter information includes at least one of the following information: quantization bit, quantization granularity, and quantization range.

At operation S22, the network device indicates a target-grouping quantization scheme to the terminal device.

In some embodiments, the network device indicates the terminal device to adopt one of a plurality of candidate grouping quantization schemes as the target-grouping quantization scheme through at least one of a broadcast message, a SIB, a RRC message, a RRC reconfiguration signaling, DCI, a MAC-CE, a PDCCH order, and data information.

At operation S23, the terminal device performs corresponding grouping and quantization according to the target-grouping quantization scheme.

The terminal device receives the indication from the network device to determine the target-grouping quantization scheme, and quantizes the CSI feedback information according to the target-grouping quantization scheme.

At operation S24, the terminal device transmits the quantized CSI feedback information to the network device.

At operation S25, the network device performs corresponding de-quantization according to the target-grouping quantization scheme.

After receiving the quantized CSI feedback information, the network device de-quantizes the quantized CSI feedback information according to the target-grouping quantization scheme.

For example, with reference to FIG. 11, the above embodiments are described in an exemplary manner. The method includes following operations.

At operation S31, the network device configures a plurality of candidate grouping quantization schemes for the terminal device.

In some embodiments, network device may pre-configure the terminal device through at least one of a broadcast message, a SIB, a RRC message, a RRC reconfiguration signaling, DCI, a MAC-CE, a PDCCH order, and data information.

In some embodiments, for any candidate grouping quantization scheme, the candidate grouping quantization scheme includes at least one of the following information: feedback mode information for each group and feedback parameter information for each group. In some embodiments, the feedback mode information includes at least one of the following information: uniform quantization and non-uniform quantization. In some embodiments, the feedback parameter information includes at least one of the following information: quantization bit, quantization granularity, and quantization range.

At operation S32, the terminal device indicates a target-grouping quantization scheme to the network device.

In some embodiments, the terminal device indicates the network device to adopt one of the plurality of candidate grouping quantization schemes as the target-grouping quantization scheme through at least one of UCI, a PUCCH, a RRC message and data information.

At operation S33, the terminal device performs corresponding grouping and quantization according to the target-grouping quantization scheme.

The terminal device groups and quantizes the CSI feedback information according to the target-grouping quantization scheme selected by itself.

At operation S34, the terminal device transmits the quantized CSI feedback information to the network device.

At operation S35, the network device performs corresponding de-quantization according to the target-grouping quantization scheme.

After receiving the quantized CSI feedback information, the network device de-quantizes the quantized CSI feedback information according to the target-grouping quantization scheme indicated by the terminal device.

It should be noted that the above method embodiments may be performed separately or in combination, which is not limited in the present disclosure.

In the above embodiments, the operations performed by the terminal device may be independently performed as an information quantization method on the side of the terminal device, and the operations performed by the network device may be independently performed as an information quantization method on the side of the network device.

FIG. 12 is a structural block diagram of an information quantization apparatus according to an exemplary embodiment of the present disclosure. The apparatus may be a terminal device, or a part of a terminal device. The apparatus includes a determination module 1201 and a quantization module 1202.

The determination module 1201 is configured to interact with a network device to determine a target-grouping quantization scheme.

The quantization module 1202 is configured to group CSI feedback information based on the target-grouping quantization scheme, and quantizes the CSI feedback information in each group according to a corresponding quantization mode of each grouping.

At least two groups are defined to correspond to different quantization modes.

In some embodiments, the determination module 1201 is configured to receive a first indication signaling transmitted by the network device, acquire the target-grouping quantization scheme based on the first indication signaling.

In some embodiments, the determination module 1201 is configured to receive a second indication signaling transmitted by the network device, acquire n candidate grouping quantization schemes based on the second indication signaling, and determine the target-grouping quantization scheme from the n candidate grouping quantization schemes. The n is a positive integer greater than 1.

In some embodiments, the determination module 1201 is configured to receive a third indication signaling transmitted by the network device, determine the target-grouping quantization scheme from the n candidate grouping quantization schemes based on the third indication signaling.

In some embodiments, the indication signaling transmitted by the network device includes at least one of a broadcast message, a SIB, a RRC message, a RRC reconfiguration signaling, DCI, a MAC-CE, a PDCCH order, and data information.

In some embodiments, the determination module 1201 is configured to transmit a fourth indication signaling to the network device, and the fourth indication signaling is configured to indicate the target-grouping quantization scheme in the n candidate grouping quantization schemes.

In some embodiments, the fourth indication signaling includes at least one of UCI, a PUCCH, a RRC message, and data information.

In some embodiments, the target-grouping quantization scheme includes at least one of the following information: feedback mode information for each group and feedback parameter information for each group.

In some embodiments, the feedback mode information includes at least one of the following information: uniform quantization and non-uniform quantization.

In some embodiments, the feedback parameter information includes at least one of the following information: quantization bit, quantization granularity, and quantization range.

In some embodiments, the CSI feedback information is generated based on a neural network model.

Figures 13, 14:
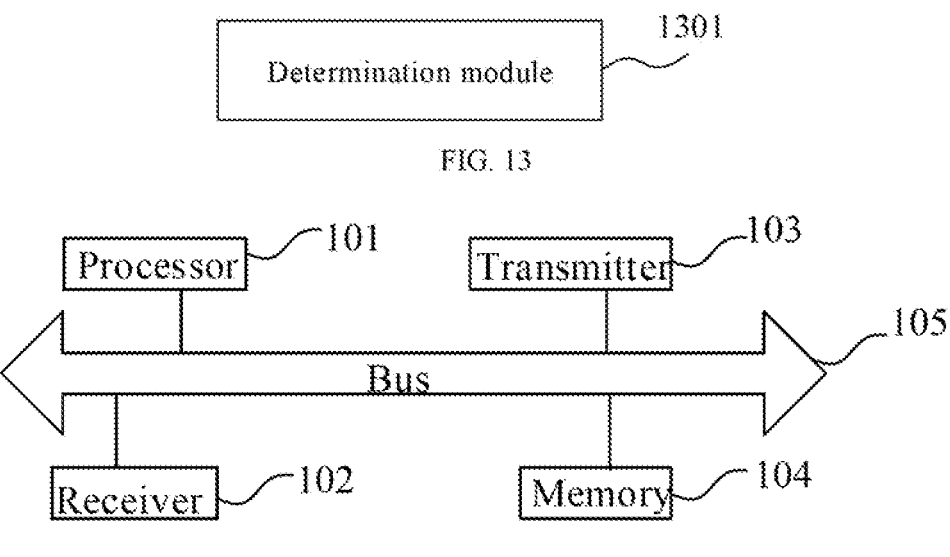
FIG. 13 is a structural block diagram of an information quantization apparatus according to an exemplary embodiment of the present disclosure.
FIG. 14 is a structural diagram of a communication device according to an exemplary embodiment of the present disclosure.

FIG. 13 is a structural block diagram of an information quantization apparatus according to an exemplary embodiment of the present disclosure. The apparatus may be a network device or a part of a network device. The apparatus includes a determination module 1301.

The determination module 1301 is configured to interact with a terminal device to determine a target-grouping quantization scheme.

The target-grouping quantization scheme is configured for the terminal device to group CSI feedback information, and quantize CSI feedback information in each group according to a corresponding quantization mode of each group. At least two groups are defined to correspond to different quantization modes.

In some embodiments, the determination module 1301 is configured to transmit a first indication signaling to the terminal device, and the first indication signaling is configured to indicate the target-grouping quantization scheme.

In some embodiments, the determination module 1301 is configured to transmit a second indication signaling to the terminal device, determine the target-grouping quantization scheme from the n candidate grouping quantization schemes. The second indication signaling is configured to indicate n candidate grouping quantization schemes, and the n is a positive integer greater than 1.

In some embodiments, the determination module 1301 is configured to transmit a third indication signaling to the terminal device. The third indication signaling is configured to indicate the target-grouping quantization scheme in the n candidate grouping quantization schemes.

In some embodiments, the indication signaling transmitted by the network device includes at least one of a broadcast message, a SIB, a RRC message, a RRC reconfiguration signaling, DCI, a MAC-CE, a PDCCH order, and data information.

In some embodiments, the determination module 1301 is configured to receive a fourth indication signaling transmitted by the terminal device, determine the target-grouping quantization scheme from the n candidate grouping quantization schemes based on the fourth instruction.

In some embodiments, the fourth indication signaling includes at least one of UCI, a PUCCH, a RRC message, and data information.

In some embodiments, the target-grouping quantization scheme includes at least one of the following information: feedback mode information for each group and feedback parameter information for each group.

In some embodiments, the feedback mode information includes at least one of the following information: uniform quantization and non-uniform quantization.

In some embodiments, the feedback parameter information includes at least one of the following information: quantization bit, quantization granularity, and quantization range.

In some embodiments, the CSI feedback information is generated based on a neural network model.

FIG. 14 is a structural diagram of a communication device (terminal device or network device) according to an exemplary embodiment of the present disclosure. The communication device includes a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 may be implemented as a communication component, which may be a communication chip recorded as a transceiver.

The memory 104 is connected to the processor 101 via the bus 105.

The memory 104 may be configured to store at least one instruction, and the processor 101 may be configured to execute the at least one instruction to perform the operations in the above method embodiments.

In addition, the memory 104 may be any type of a transitory, a non-transitory storage device or their combination. Transitory or non-transitory storage devices include but are not limited to: a disk, an optical disk, an electrically erasable programmable read-only memory (EEPROM), an erasable programmable read-only memory (EPROM), a static ready access memory (SRAM), a read-only memory (ROM), a magnetic memory, a flash memory, a programmable read only memory (PROM).

When the communication device is a terminal device, the processor and the transceiver in the communication device involved in embodiments of the present disclosure may execute the operations performed by the terminal device in any of the methods shown in FIGS. 6 to 11 above, which will not be repeated here.

In some embodiments, the communication device is a terminal device.

The transceiver is configured to interact with a network device to determine a target-grouping quantization scheme.

The processor is configured to group CSI feedback information based on the target-grouping quantization scheme, and quantize the CSI feedback information in each group according to a corresponding quantization mode of each group.

At least two groups are defined to correspond to different quantization modes.

When the communication device is a network device, the processor and transceiver in the communication device involved in embodiments of the present disclosure may execute the operations performed by the network device in any of the methods shown in FIGS. 6 to 11 above, which is not repeated here.

In some embodiments, the communication device is a network device.

The transceiver is configured to interact with a terminal device to determine a target-grouping quantization scheme.

The target-grouping quantization scheme is configured for the terminal device to group CSI feedback information, and quantize the CSI feedback information in each group according to a corresponding quantization mode of each group. At least two groups are defined to correspond to different quantization modes. In an exemplary embodiment, a computer-readable storage medium is also provided. The computer-readable storage medium stores at least one instruction, at least one program, code set or instruction set. The at least one instruction, at least one program, code set or instruction set is loaded and executed by the processor to realize the information quantization method executed by the communication device according to above various method embodiments.

In an exemplary embodiment, a chip is also provided and includes programmable logic circuits and/or program instructions, and the chip is configured to perform the information quantization method described above when the chip is run on a computer device.

In an exemplary embodiment, a computer program product is also provided and enables a computer device to perform the information quantization method described above when the computer program product is run on a processor of the computer device.

Those skilled may understand that, all or some of the operations implementing the above embodiments may be performed by a hardware, or may be performed by indicating a relevant hardware through a program. The program may be stored in a computer-readable storage medium, which may be a read-only memory, a disk, or an optical disk.

Above description are only alternative embodiments of the present disclosure, but does not limit the present disclosure. Any modification, equivalent replacement, and improvement, etc. within spirit and principle of the present disclosure should be included in the protection scope of the present disclosure.

What is claimed is:

1. An information quantization method, performed by a terminal device, comprising:
   determining a target-grouping quantization scheme;
   grouping a channel state information (CSI) feedback information based on the target-grouping quantization scheme, wherein the CSI feedback information is divided into a plurality of groups for feedback by the target-grouping quantization scheme; and quantizing the CSI feedback information in each of the plurality of groups according to a corresponding quantization mode of each group;
   wherein at least two of the plurality of groups are defined to correspond to different quantization modes.

2. The method as claimed in claim 1, wherein the determining a target-grouping quantization scheme, comprises:
   receiving a first indication signaling from a network device; and
   acquiring the target-grouping quantization scheme based on the first indication signaling.

3. The method as claimed in claim 1, wherein the determining a target-grouping quantization scheme, comprises:
   receiving a second indication signaling from a network device;

acquiring n candidate grouping quantization schemes based on the second indication signaling, wherein the n is a positive integer greater than 1; and
determining the target-grouping quantization scheme from the n candidate grouping quantization schemes.

4. The method as claimed in claim 3, wherein the determining the target-grouping quantization scheme from the n candidate grouping quantization schemes comprises:
   receiving a third indication signaling from the network device;
   determining the target-grouping quantization scheme from the n candidate grouping quantization schemes based on the third indication signaling.

5. The method as claimed in claim 2, wherein the indication signaling comprises at least one of:
   a broadcast message,
   a system information block (SIB),
   a radio resource control (RRC) message,
   a RRC reconfiguration signaling,
   downlink control information DCI,
   a media access control (MAC)-control cell (CE),
   a physical downlink control channel (PDCCH) order, and
   data information.

6. The method as claimed in claim 3, further comprising:
   transmitting a fourth indication signaling to the network device;
   wherein the fourth indication signaling is configured to indicate the target-grouping quantization scheme from in the n candidate grouping quantization schemes.

7. The method as claimed in claim 6, wherein the fourth indication signaling comprises at least one of:
   uplink control information (UCI),
   a physical uplink control channel (PUCCH),
   a RRC message, and
   data information.

8. The method as claimed in claim 1, wherein the target-grouping quantization scheme comprises at least one of:
   feedback mode information for each group and feedback parameter information for each group.

9. The method as claimed in claim 8, wherein the feedback mode information comprises at least one of:
   uniform quantization and non-uniform quantization.

10. The method as claimed in claim 8, wherein the feedback parameter information comprises at least one of:
   quantization bit,
   quantization granularity, and
   quantization range.

11. A terminal device, comprising:
   a processor; and
   a memory for storing at least one instruction that when executed by the processor causes the terminal device to interact with a network device to determine a target-grouping quantization scheme;
   group channel state information (CSI) feedback information based on the target-grouping quantization scheme, wherein the CSI feedback information is divided into a plurality of groups for feedback by the target-grouping quantization scheme; and quantize the CSI feedback information in each of the plurality of groups according to a corresponding quantization mode of each group;
   wherein at least two of the plurality of groups are defined to correspond to different quantization modes.

12. The terminal device as claimed in claim 11, wherein indication signaling transmitted by the network device comprises at least one of:
   a broadcast message,
   a system information block (SIB), a radio resource control (RRC) message, a RRC reconfiguration signaling, downlink control information DCI, a media access control (MAC)-control cell (CE), a physical downlink control channel (PDCCH) order, and data information.

13. The terminal device as claimed in claim 11, wherein the processor is configured to execute the at least one instruction to cause the terminal device to:

receive a second indication signaling transmitted by the network device;

acquire n candidate grouping quantization schemes based on the second indication signaling; wherein the n is a positive integer greater than 1;

determine the target-grouping quantization scheme from the n candidate grouping quantization schemes; and transmit a fourth indication signaling to the network device; wherein the fourth indication signaling is configured to indicate the target-grouping quantization scheme in the n candidate grouping quantization schemes.

14. The terminal device as claimed in claim 11, wherein the target-grouping quantization scheme comprises at least one of:

feedback mode information for each group and feedback parameter information for each group.

15. A network device, comprising:

a processor; and a memory for storing at least one instruction that, when executed by the processor causes the network device to interact with a terminal device to determine a target-grouping quantization scheme;

wherein the target-grouping quantization scheme is configured for the terminal device to; group a channel state information (CSI) feedback information, wherein the CSI feedback information is divided into a plurality of groups for feedback by the target-grouping quantization scheme; and quantize the CSI feedback information in each of the plurality of groups according to a corresponding quantization mode of each group; wherein at least two of the plurality of groups are defined to correspond to different quantization modes.

16. The network device as claimed in claim 15, wherein the processor is configured to execute the at least one instruction to cause the network device to:

transmit a second indication signaling to the terminal device; wherein the second indication signaling is configured to indicate n candidate grouping quantization schemes, and the n is a positive integer greater than 1; and determine the target-grouping quantization scheme from the n candidate grouping quantization schemes.

17. The network device as claimed in claim 16, wherein the processor is configured to execute the at least one instruction to cause the network device to:

transmit a third indication signaling to the terminal device; wherein the third indication signaling is configured to indicate the target-grouping quantization scheme in the n candidate grouping quantization schemes.

18. The network device as claimed in claim 16, wherein the processor is configured to execute the at least one instruction to cause the network device to:

receive a fourth indication signaling transmitted by the terminal device; and determine the target-grouping quantization scheme from the n candidate grouping quantization schemes based on the fourth indication signaling;

wherein the fourth indication signaling comprises at least one of uplink control information (UCI), a physical uplink control channel (PUCCH), a RRC message, and data information.

19. The network device as claimed in claim 15, wherein the target-grouping quantization scheme comprises at least one of feedback mode information for each group and feedback parameter information for each group.

20. The network device as claimed in claim 19, wherein the feedback parameter information comprises at least one of:

quantization bit, quantization granularity, and quantization range.

* * * * *